United States Patent [19]

McKeown

[11] 4,331,341
[45] May 25, 1982

[54] REFUSE RECEPTACLE PROTECTOR

[76] Inventor: John A. McKeown, 2057 Morton St., Muskegon, Mich. 49441

[21] Appl. No.: 149,911

[22] Filed: May 15, 1980

[51] Int. Cl.³ .......................... B62B 3/00; B62B 9/04; B65D 25/24

[52] U.S. Cl. .............................. 280/47.34; 280/12 R; 220/1 T; 220/18; 428/35

[58] Field of Search .................. 220/1 T, 18; 428/35; 280/47.34, 79.1 R, 79.1 A, 79.2, 15, 12 R

[56] References Cited

U.S. PATENT DOCUMENTS

| | | | |
|---|---|---|---|
| 646,163 | 3/1900 | Bachner | 220/1 T |
| 2,626,078 | 1/1953 | Hutchisson, Jr. et al. | 220/18 |
| 3,229,991 | 1/1966 | Tessler et al. | 280/12 R |
| 3,542,220 | 11/1970 | Propst | 280/79.2 |
| 3,545,644 | 12/1970 | Toyama et al. | 220/404 |
| 3,866,936 | 2/1975 | Hedges | 220/1 T |
| 3,868,040 | 2/1975 | Langmack, Jr. et al. | 220/18 |
| 4,005,253 | 1/1977 | Walter | 220/18 |
| 4,021,131 | 5/1977 | Bakken et al. | 220/18 |
| 4,045,042 | 8/1977 | Walter | 280/79.1 R |
| 4,217,073 | 8/1980 | Propst | 220/1 T |

Primary Examiner—William R. Dixon, Jr.
Attorney, Agent, or Firm—James F. Lesniak; John A. Waters

[57] ABSTRACT

A refuse receptacle protector comprising a rigid hollow enclosure which is closed at the top and open at the bottom which is used for preventing spilling of trash by wind, animals and the like and which camouflages the unsightly appearance of trash receptacles. The protector has an anti-tipping means such as a weighted top or bottom or spikes to resist tipping of the protector by an external force and is preferably domed-shaped with a handle on the external side wall thereof. Transporting means are provided to transport the protector in the inverted position to render it useable for transporting refuse receptacles.

8 Claims, 12 Drawing Figures

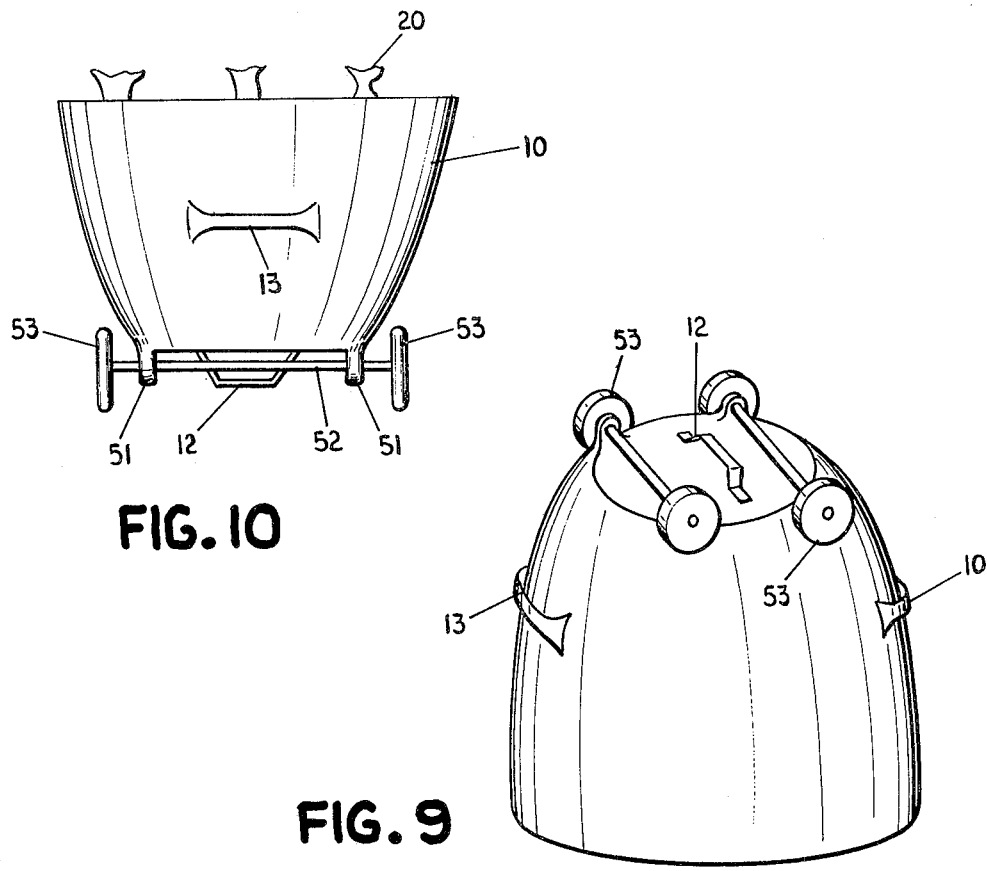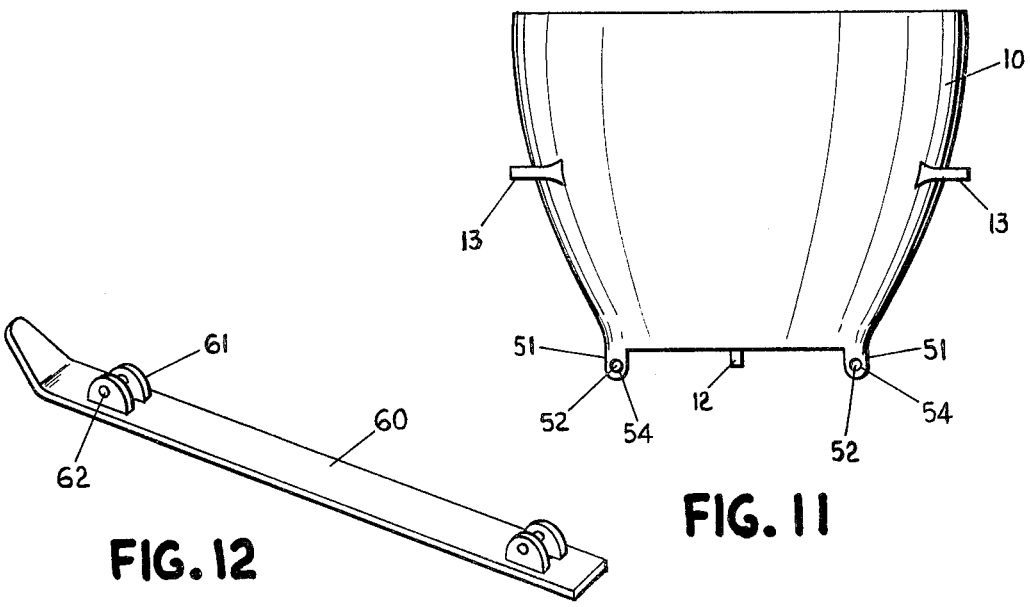

4,331,341

REFUSE RECEPTACLE PROTECTOR

BACKGROUND OF THE INVENTION

1. Field of the Invention

This invention relates to refuse receptacle protectors, and, more particularly, to a refuse receptacle protector which hides the unsightly appearance of refuse receptacles and protects them from spilling due to wind, animals and the like.

2. Description of the Prior Art

The general unsightliness of trash receptacles is obvious. As is well known, the unsightly aspects of refuse receptacles are greatly magnified when the receptacles are blown over by the wind or tipped by animals, vandals and the like, especially when they are sitting in front of a residence awaiting trash collection and the contents are strewn over a manicured lawn. In recent years, the plastic garbage or trash bag has been in widespread use. However, unlike the more conventional metal trash cans which can be equipped with lids to provide a certain measure of protection against entry by animals or spilling the contents in the case of being knocked over by the wind or the like, plastic trash bags are easily accessible to intruding animals. While devices have been proposed to combat the above problems, none has been entirely satisfactory, especially for use with plastic trash bags. Some such devices merely improve the aesthetics without avoiding the spilling problem, while others that provide protection are unsightly in themselves. Finally, devices proposed heretofore to solve both types of problems have involved expensive and generally permanent structures. Thus, it is an object of the present invention to provide a simple and economical refuse receptacle protector which is ideally suited for use with plastic trash bags which permits the user to continue to enjoy the advantages of using plastic trash bags while effectively eliminating the disadvantages thereof.

SUMMARY OF THE INVENTION

According to the present invention there is provided a refuse receptacle protector which comprises a rigid hollow enclosure which is closed at the top and open at the bottom. The protector has anti-tipping means which comprises either weight means at the top or bottom of the enclosure or one or more spikes at the bottom of the enclosure to resist tipping of the enclosure by an external force such as wind, animals and the like. The refuse receptacle protector is preferably dome-shaped and has at least one handle on the external side wall thereof for tipping the protector to either cover or expose the refuse receptacle, or for pulling the protector when transporting it as discussed below. One preferred weight means is a weighted rim around the periphery of the bottom of the enclosure.

In a further embodiment of the present invention, means are provided for transporting the protector in the inverted position so that the protector is thereby useable to transport refuse receptacles. One transporting means comprises a wagon or a sleigh having a center opening sized to accept the upper portion of the protector. The preferred transporting means comprises wagon wheels or sleigh runners attached to the top of the protector. In this embodiment, the wagon wheels or sleigh runners also function as the anti-tipping weight means.

BRIEF DESCRIPTION OF THE DRAWINGS

FIG. 9 is a perspective view of the refuse receptacle protector with attached transporting wheels;

FIG. 10 is a front elevational view of the protector of FIG. 9 in the inverted position;

FIG. 11 is a front elevational view of the protector of FIG. 9 in the inverted position with the wheels removed; and FIG. 12 is a perspective view of a sleigh runner for attachment to the protector of FIG. 11.

DESCRIPTION OF THE PREFERRED EMBODIMENTS

Figure 1:
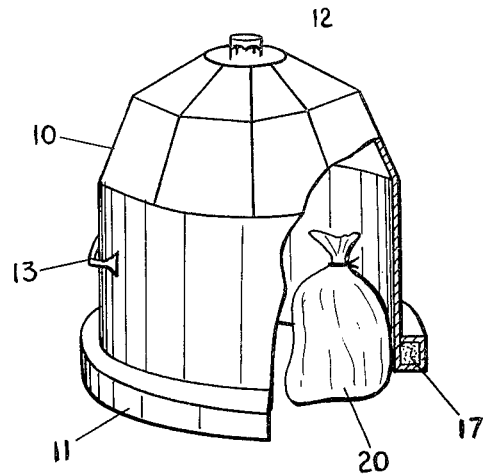
FIG. 1 is a perspective view of a refuse receptacle protector according to the present invention with a partially cut-away section to expose a typical trash bag being protected.

Referring to the drawings in greater detail, in FIG. 1 there is shown a generally dome-shaped rigid enclosure 10 which is closed on top and open at the bottom. As shown by the cut-away portion of the side wall, the protector 10 is in place over a filled plastic trash bag 20. An anti-tipping means is provided in the form of a weighted rim 11 around the bottom periphery of the enclosure 10 to provide stability to the protector when it is in place over trash bags and to prevent the protector from tipping when exposed to external forces such as wind or aggressive animals, such as dogs, cats, raccoons and the like. Rim 11 can be constructed from a relatively heavy material such as steel to provide the requisite weight or it can be a hollow plastic channel or the like with a weight material added to the core such as sand 17, lead shot, or the like. While the weighted rim is the preferred weight means, variations may be employed such as a series of spaced weights attached to the bottom periphery of enclosure 10.

A handle 12 is provided on the top of enclosure 10 and at least one handle 13 is provided on the external side wall thereof. These handles facilitate both covering and uncovering trash bags such as trash bag 20. Because of side handle 13, the protector can be tilted to expose the trash bag. Thus, it is easily used by a child or housewife since there is no need for completely lifting the entire weight of the protector. Side handle 13 is also used to pull the protector when transporting it in the inverted position as discussed hereinafter.

Figure 2:
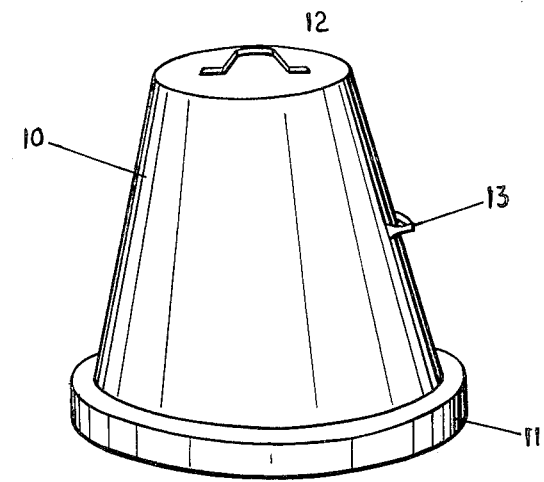
FIGS. 2 and 3 are perspective views of variations of the configurations of the refuse receptacle protector.
Figure 3:
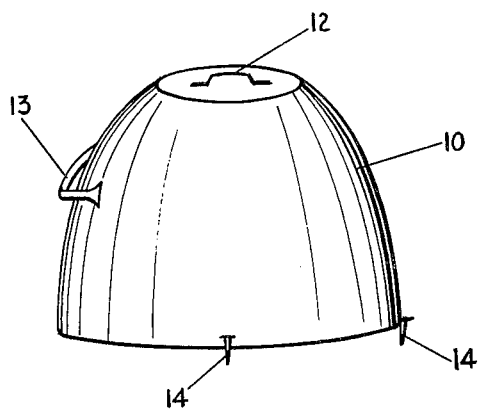

FIGS. 2 and 3 show other geometrrical configurations of enclosure 10 for aesthetic purposes and also to be able to accommodate refuse receptacles of different sizes and configurations.

Figure 4:
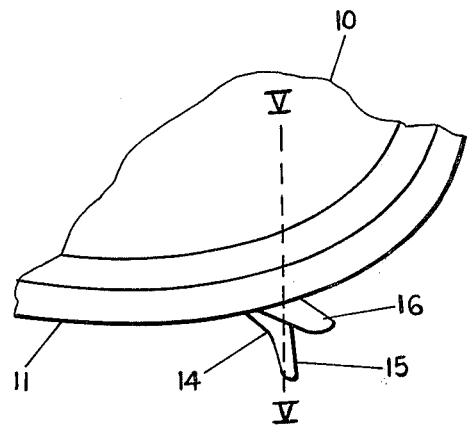
FIG. 4 is a fragmentary perspective view of a protector with a depending spike.
Figure 5:
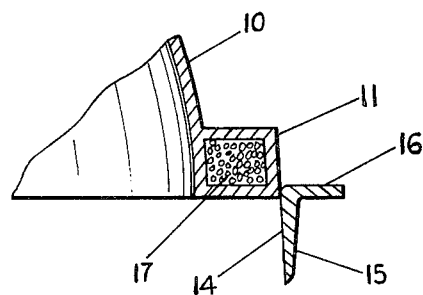
FIG. 5 is a sectional view taken along the line V—V of FIG. 4.
Figure 6:
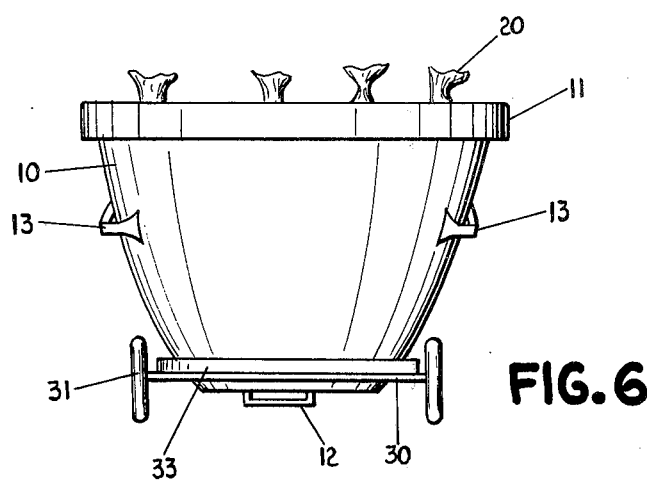
FIG. 6 is a front elevational view of the combination of a refuse receptacle protector and a wagon according to the present invention.
Figure 7:
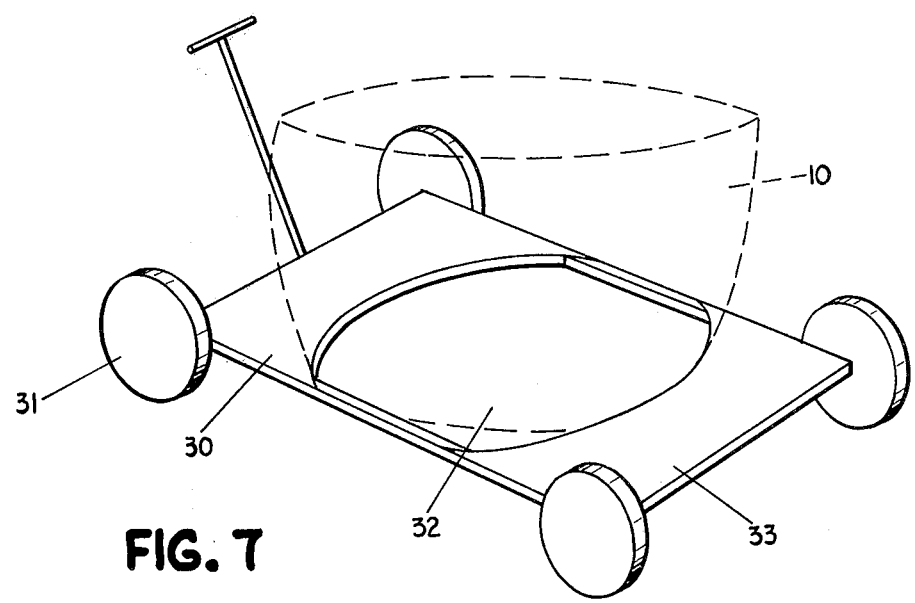
FIG. 7 is a perspective view of the wagon of FIG. 6 with the receptacle protector shown in phantom.

FIG. 4, which is a fragmentary perspective view of a protector, illustrates the use of foot spike 14 which is mounted at the bottom periphery of enclosure 10. As best shown in FIG. 5, foot spike 14 includes a pointed depending spike portion 15 and a broadened, flat protruding head 16. One or more of spikes 14, preferably three, are provided around the bottom periphery of the protector for use in anchoring the protector to the ground to either supplement the stability provided by the weighted rim 11, or in place of any weight means as shown in FIG. 3. Thus, when foot spikes are used, the protector is placed over the trash bag 20 and then foot pressure is exerted on head 16 to drive the point 15 of spike 14 into the ground.

FIGS. 6 through 12 illustrate the combination of the receptacle protector and means for transporting it in the inverted position whereby it is useful for transporting refuse receptacles such as filled trash bags 20. In the embodiment shown in FIGS. 6 and 7, the transporting means is a wagon 30 with conventional wheels 31. An opening 32 is provided in the center of the wagon which is sized to accept the upper portion of enclosure 10 when in the inverted position as shown. The opening should be large enough so that the dome-shaped top of enclosure 10 seats firmly in the opening, but which permits the side walls of the enclosure to contact the wagon platform 33 by virtue of the increasing diameter of enclosure 10 before enclosure 10 sinks to a point where handle 12 would touch the ground.

Thus, in use the receptacle protector can be mounted in the inverted position on wagon 30 and can then be loaded with filled trash bags. The wagon is then easily pulled out to the site for collection or storage. The trash bags can then be unloaded and placed on the ground in a group, and then the receptacle protector can be placed thereover to protect against the unsightliness of spilled trash. Furthermore, because of the side handle 13 and the preferred dome-shape of the enclosure, it can be loaded and unloaded from wagon 30 by a tipping and rocking movement thereby eliminating any need to lift the protector.

Figure 8:
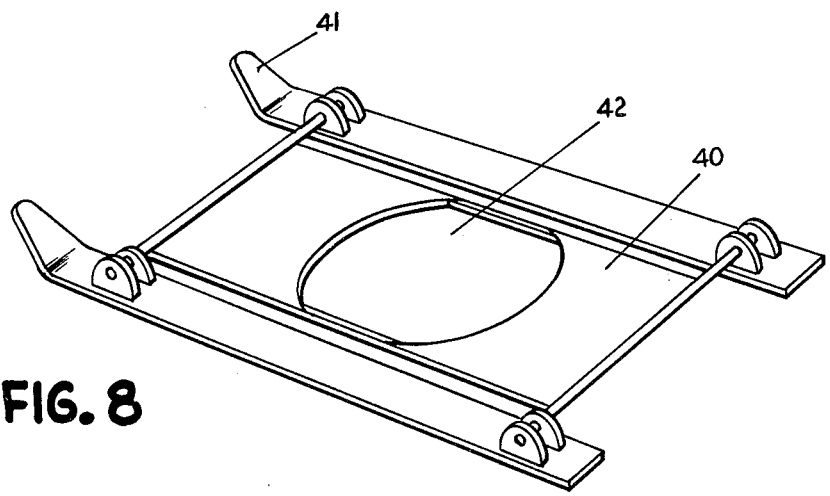
FIG. 8 is a sleigh for use in combination with the refuse receptacle protector of the present invention.

In the wintertime, instead of the use of wagon 30, a sleigh 40 may be used such as shown in FIG. 8. Sleigh 40 includes a pair of runners 41 and an opening 42 which function in the same way as opening 32 and wagon 30 of FIG. 7.

In another embodiment, as shown in FIG. 9 through 12, either wheels or sleigh runners are attached to the top of enclosure 10 to provide a unitized construction. As shown, enclosure 10 has two pair of opposed axle bosses 51. An axle 52 is run through each pair of bosses and wheels 53 are mounted on the ends of the axles in a conventional manner, e.g., with cotter pins. In this embodiment, when the protector is in place in the covering position, as in FIG. 9, the weight of the wheel and axle assemblies on the top functions as the anti-tipping weight means, and bottom weight means or spikes are not required. Of course, in anticipation of a high wind environment or areas where large animal intruders are prevalent, the bottom weight means or spikes or both can be added for additional stability.

In FIG. 11, the wheels 53 have been removed and can be replaced with a pair of sleigh runners 60 (FIG. 12) for use in snow and ice conditions. Each runner has two pair of axle bosses 61 which mate with the corresponding axle bosses 51 of enclosure 10. To install the runners, the axles 52 are removed. The runners 60 are then placed on enclosure 10 so that each enclosure axle boss 51 seats between a pair of runner axle bosses 61, with the corresponding axle holes 54 and 62 aligned. Axles 52 are then reinstalled through opposing sets of holes 54 and 62 in a conventional manner and secured, e.g., with cotter pins.

The materials used to construct the receptacle protectors and transporting means of the present invention are a matter of choice, although it is preferred that enclosure 10 be constructed from a molded plastic material because of its weather resistance, light weight and economical variations possible in both color and configuration. The materials used for the transporting means are conventional, although plastic wheels and runners and steel axles are preferred.

While preferred embodiments of the present invention have been described and illustrated, it will be obvious to those skilled in the art that various modifications and variations may be made without departing from the spirit of the present invention. Thus, it is to be understood that the scope of the present invention is limited only by the following claims.

The embodiments of the invention in which an exclusive property or privelege is claimed are defined as follows:

1. A refuse receptacle protector comprising a rigid hollow enclosure, said enclosure being closed at the top and open at the bottom and said enclosure having anti-tipping means integral therewith to resist tipping of said enclosure by an external force, whereby said protector is useable to protect refuse at any desired location with no special preparation of said location, wherein said enclosure is generally dome-shaped with at least one handle on the external sidewall thereof and said anti-tipping means comprises a weighted rim around the periphery of the bottom of said enclosure.

2. A refuse receptacle protector according to claim 1 wherein said anti-tipping means further comprises at least one spike depending below the bottom of said enclosure for anchoring said enclosure to the ground.

3. In combination, a refuse receptacle protector according to claim 1 and means for transporting said protector in the inverted position whereby said protector is useable to transport refuse receptacles.

4. The combination according to claim 3 wherein said protector is generally dome-shaped and said means for transporting said protector comprises a wagon having a center opening sized to accept the upper portion of said protector.

5. The combination according to claim 3 wherein said protector is generally dome-shaped and said means for transporting said protector comprises a sleigh having a center opening sized to accept the upper portion of said protector.

6. A refuse receptacle protector comprising a rigid hollow enclosure, said enclosure being closed at the top and open at the bottom and said enclosure having anti-tipping means to resist tipping of said enclosure by an external force and transporting means attached to the top of said enclosure whereby said protector is useable to transport refuse receptacles in the inverted position.

7. The refuse receptacle protector according to claim 6 wherein said transporting means comprises a pair of axle and wheel assemblies mounted on the top of said enclosure.

8. The refuse receptacle protector according to claim 6 wherein said transporting means comprises a pair of sleigh runners mounted on the top of said enclosure.

* * * * *